A. E. CALK.
CULTIVATOR FENDER.
APPLICATION FILED JUNE 30, 1920.
1,377,183.
Patented May 10, 1921.
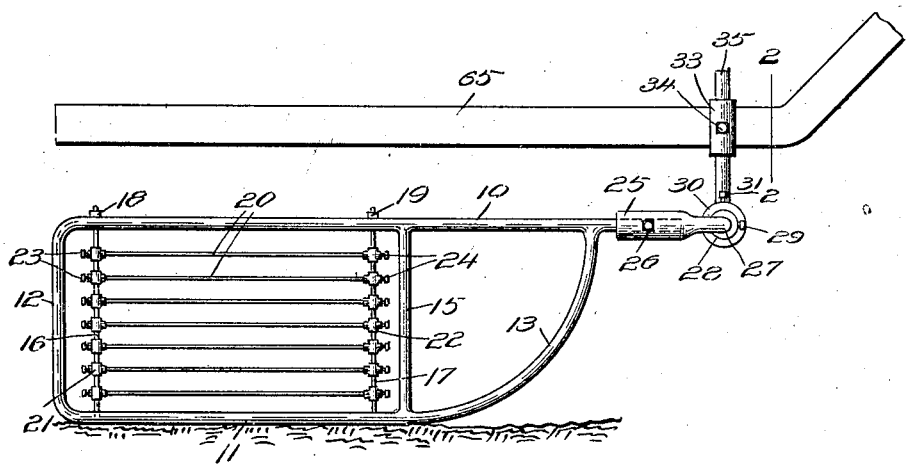
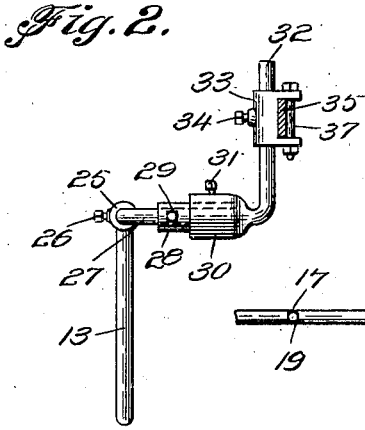
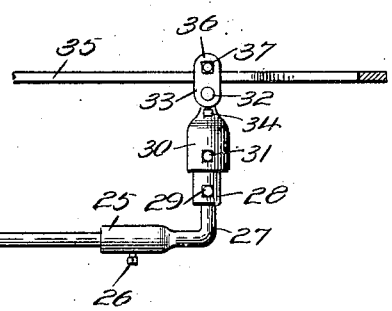
Inventor
A. E. Calk.
By Geo. P. Kimmel
Attorney

UNITED STATES PATENT OFFICE.

ALONZO E. CALK, OF BRADY, TEXAS.

CULTIVATOR-FENDER.

1,377,183.	Specification of Letters Patent.	Patented May 10, 1921.

Application filed June 30, 1920. Serial No. 393,030.

*To all whom it may concern:*

Be it known that I, ALONZO E. CALK, a citizen of the United States, residing at Brady, in the county of McCulloch and State of Texas, have invented certain new and useful Improvements in a Cultivator-Fender, of which the following is a specification.

This invention relates to cultivator fenders, and has for one of its objects to provide a device of this character which may be coupled to cultivators of various makes and forms, and which will effectively prevent large clods of earth or stones from being thrown upon plants when plowing between rows, while at the same time permitting finely divided earth to pass therethrough and be deposited around the plants.

Another object of the invention is to provide a device of this character having means for adjustment relative to the cultivator whereby the fender may be set to travel in any required position with respect to the contour of the ground in which the cultivator is operated.

With these and other objects in view, the invention consists in certain novel features of construction as hereinafter shown and described and then specifically pointed out in the claims, and in the drawings illustrative of the preferred embodiment of the invention.

Figure 1 is a side elevation of a portion of a conventional cultivator with the improved fender attached.

Fig. 2 is a front elevation with the cultivator beam in section on the line 2—2 of Fig. 1.

Fig. 3 is a plan view of the parts shown in Fig. 1.

The improved device comprises a substantially oblong frame including a relatively long upper member or rail 10, a shorter lower member or rail 11, a vertical rear member 12 united to the rear ends of the upper and lower rails, a forward member 13 united to the forward end of the lower rail member 11 and curving upwardly and forwardly and united to the upper rail member 10 rearwardly of its forward end, as shown.

The members 10 and 11 are braced and supported by an intermediate member 15, if required. The frame thus far described is preferably constructed of metal, preferably welded at the junctures of its members, the lower member 11 and the forward curved member 13 constituting a runner operated over the ground.

The members 10 and 11 are connected by spaced supports 16 and 17, preferably of rods passing at the ends through the members 10 and 11, and secured in place by clamp nuts 18 and 19.

Disposed within the space defined by the members 10 and 11 and supports 16 and 17, are a plurality of rods 20, each rod having sleeve like terminals 21 and 22 slidably engaging the rods 16 and 17, and secured adjustably thereto as by set screws 23 and 24.

By this means the rods 20 may be spaced to any required extent, to adapt the device to the condition of the soil over which the cultivator is operated.

Where the earth contains large clods, stones or the like, the rods 20 will be spaced a greater distance than where the clods and other material is finer, so that the device may be readily adjusted to permit the finely divided earth only to pass, while preventing clods, stones and the like to be thrown against the plants of the adjoining rows. The fender serves to throw the larger material away from the plants while at the same time permitting the finely divided earth to pass and be deposited around the plants.

The forward extended end of the member 10 is received in a socket 25 and is movable both rotatably and longitudinally therein and clamped in adjusted position by a set screw 26.

The socket 25 is extended laterally into an arm 27, and the latter is received in a sleeve 28 in which it is movable both rotatably and longitudinally and clamped in adjusted position by a set screw 29.

The sleeve 28 is received in a socket 30 in which it is movable both rotatably and longitudinally and clamped in adjusted position by a set screw 31.

The socket 30 is extended into a vertical arm 32, and is received in a sleeve 33 and is clamped in adjusted position therein by a set screw 34. The sleeve 33 is adapted to be attached in any suitable manner to a cultivator, for instance to one of the beams represented at 35. For the purpose of illustration the means for coupling the sleeve 33 to the beam 35 consists of ears 36 and a clamp bolt 37, as shown.

By this arrangement the fender device may be adjusted universally relative to the cultivator, and the rods 20 adjusted to correspond to the condition of the soil.

The preferred embodiment of the invention is disclosed in the drawings and set forth in the specifications, but it will be understood that any modifications within the scope of the claims may be made in the construction without departing from the principle of the invention or sacrificing any of its advantages.

I claim:

1. A cultivator fender including a horizontal member, a support coupled at one end to the horizontal member and including a laterally directed arm, a sleeve adjustably engaging over said arm, a support including a horizontal socket adjustably engaging over said sleeve and a vertical arm, and means adapted to attach said vertical arm to a cultivator.

2. A cultivator fender including an oblong frame, means adapted to couple said frame to a cultivator, vertical supporting members attached to said frame in spaced relation, and a plurality of rods adjustably engaging said vertical supports.

In testimony whereof, I affix my signature hereto.

ALONZO E. CALK.